United States Patent
Cheun et al.

(10) Patent No.: US 7,433,413 B2
(45) Date of Patent: Oct. 7, 2008

(54) DATA TRANSMISSION APPARATUS AND METHOD IN AN OFDM COMMUNICATION SYSTEM

(75) Inventors: Kyung-Whoon Cheun, Seoul (KR); Joo-Yeol Yang, Daegu (KR); Jong-Hyeuk Lee, Seongnam-si (KR)

(73) Assignees: Samsung Electronics Co., Ltd (KR); Seoul National University Industry Foundation (KR)

( * ) Notice: Subject to any disclaimer, the term of this patent is extended or adjusted under 35 U.S.C. 154(b) by 641 days.

(21) Appl. No.: 11/020,532

(22) Filed: Dec. 23, 2004

(65) Prior Publication Data

US 2005/0141414 A1    Jun. 30, 2005

(30) Foreign Application Priority Data

Dec. 24, 2003    (KR) ................ 2003-96811

(51) Int. Cl.
*H04K 1/10* (2006.01)
(52) U.S. Cl. ............... 375/260; 375/259; 375/148; 375/130; 375/267; 370/210; 370/208; 370/343; 455/101; 455/522
(58) Field of Classification Search ........ 375/148, 375/130, 260, 267, 299
See application file for complete search history.

(56) References Cited

U.S. PATENT DOCUMENTS

| | | | |
|---|---|---|---|
| 6,377,631 B1 * | 4/2002 | Raleigh ............... | 375/299 |
| 6,775,260 B1 * | 8/2004 | Dabak et al. .......... | 370/342 |
| 6,850,481 B2 * | 2/2005 | Wu et al. ............. | 370/208 |
| 6,985,434 B2 * | 1/2006 | Wu et al. ............. | 370/208 |
| 7,020,072 B1 * | 3/2006 | Li et al. .............. | 370/208 |
| 2004/0082356 A1 * | 4/2004 | Walton et al. ........ | 455/522 |
| 2005/0078763 A1 * | 4/2005 | Choi et al. ........... | 375/267 |
| 2006/0126489 A1 * | 6/2006 | Quyang et al. ....... | 370/208 |

FOREIGN PATENT DOCUMENTS

| | | |
|---|---|---|
| EP | 1 156 598 | 11/2001 |
| EP | 1 185 001 | 3/2002 |
| WO | WO 01/45300 | 6/2001 |

* cited by examiner

*Primary Examiner*—Shuwang Liu
*Assistant Examiner*—Kenneth Lam
(74) *Attorney, Agent, or Firm*—The Farrell Law Firm, PC

(57) ABSTRACT

An apparatus and method for transmitting data on a plurality of frequency sub-channels for a plurality of successive symbol periods through a plurality of transmit antennas in an OFDM system. In the data transmitting apparatus, an S/P converter converts information symbols received from a data source to an information symbol vector, a coder generates at least one code symbol vector using the information symbol vector in at least one symbol period, an IFFT unit generates at least as many transmission signal vectors as twice the number of code symbol vectors generated in the coder for the one symbol period, a plurality of P/S converters each convert the transmission signal vectors to a transmission signal stream, and a guard interval inserter inserts a guard interval into each of the transmission signal streams received from the P/S converters.

17 Claims, 8 Drawing Sheets

DATA TRANSMISSION APPARATUS AND METHOD IN AN OFDM COMMUNICATION SYSTEM

PRIORITY

This application claims priority under 35 U.S.C. § 119 to an application entitled "Data Transmission Apparatus and Method in an OFDM Communication System" filed in the Korean Intellectual Property Office on Dec. 24, 2003 and assigned Serial No. 2003-96811, the contents of which are incorporated herein by reference.

BACKGROUND OF THE INVENTION

1. Field of the Invention

The present invention relates generally to an Orthogonal Frequency Division Multiplexing (OFDM) communication system, and in particular, to an apparatus and method for transmitting data in an OFDM communication system.

2. Description of the Related Art

OFDM and space-time coding have recently received a great deal of interest as fundamental technologies for supporting high data rates required for future-generation wireless communication service. OFDM is a transmission scheme in which one serial data stream is divided into $N_c$ parallel data streams and simultaneously transmitted on $N_c$ sub-carriers. Given a sufficient $N_c$ value and a sufficient guard interval, each sub-channel experiences frequency flat fading, making it possible to use a modulation scheme with a relatively high modulation order. Due to the advantages of high bandwidth efficiency and robustness under a multi-path channel environment, OFDM was adopted as the standard of a wireless LAN (Local Area Network) system such as IEEE (Institute of Electrical and Electronics Engineers) 802.11a or ETSI (European Telecommunications Standards Institute) HIPERLAN (High PERformance LAN) type2, and a broadcasting system such as DAB (Digital Audio Broadcasting) or DVB-T (Digital Video Broadcasting-Terrestrial).

Space-time coding provides spatial diversity through a plurality of transmit antennas under a fading channel environment. The results of many studies on space-time trellis codes and space-time block codes under a frequency flat fading channel environment have recently been reported. Specifically, Alamouti's space-time block code offers a full diversity gain at a full rate in a system using two transmit antennas and a low decoding complexity. Therefore, it has been adopted as a standard for $3^{rd}$ generation (3G) mobile communication systems, such as WCDMA (Wideband Code Division Multiple Access) and CDMA2000.

OFDM systems using space-time block coding and space-frequency block coding based on the Alamouti's code have been proposed in the recent years. Assuming that a channel has not changed over two successive OFDM symbol periods, the Alamouti's code can be applied to the two OFDM symbols. This is called Alamouti's-Space-Time Block Code-Orthogonal Frequency Division Multiplexing (A-STBC-OFDM). If a channel has not changed with respect to adjacent sub-carriers, the Alamouti's code can be applied to the adjacent sub-carriers. This is called Alamouti's-Space-Frequency Block Code-Orthogonal Frequency Division Multiplexing (A-SFBC-OFDM).

FIG. 1 is a block diagram of a conventional transmitter in an A-STBC-OFDM/A-SFBC-OFDM system using Alamouti's code. Referring to FIG. 1, in the conventional transmitter, a serial-to-parallel (S/P) converter 102 converts $N_c$ information symbols received from a data source 100 to a symbol vector $D_s$ of length $N_c$, as is shown below in Equation (1).

$$D_s \triangleq [D_s[0], D_s[1], \ldots, D_s[N_c-1]] \quad (1)$$

$N_c$ is assumed to be equal to an IFFT (Inverse Discrete Fourier Transform) length. It is a power of 2.

Using two successive symbol vectors $D_s$ and $D_{s+1}$, an A-STBC-OFDM coder 104 generates four space-time code symbol vectors $X_{1,s}$, $X_{2,s}$, $X_{1,s+1}$ and $X_{2,s+1}$ to be transmitted in sth and (s+1)th OFDM symbol periods. The space-time code symbol vector $X_{1,s}$ can be generalized as in Equation (2), $$X_{l,m} \triangleq [X_{l,m}[0], X_{l,m}[1], \ldots, X_{l,m}[N_c-1]] \quad (2)$$

where l=1, 2 and m=s, s+1. $X_{l,m}[k]$ represents a space-time code symbol transmitted on a kth sub-carrier in an mth OFDM symbol period through an lth transmit antenna.

Because the A-STBC-OFDM coder 104 is based on Alamouti's space-time block code, in Equation (3), $$\begin{bmatrix} X_{1,s}[k] & X_{1,s+1}[k] \\ X_{2,s}[k] & X_{2,s+1}[k] \end{bmatrix} \triangleq \begin{bmatrix} D_s[k] & D^*_{s+1}[k] \\ D_{s+1}[k] & -D^*_s[k] \end{bmatrix} \quad (3)$$

where x* is the complex conjugate of x. Further, in Equations (4a), (4b), (4c), and (4d):

$$X_{1,s} = [D_s[0], D_s[1], \ldots, D_s[N_c-1]] \quad (4a)$$

$$X_{2,s} = [D_{s+1}[0], D_{s+1}[1], \ldots, D_{s+1}[N_c-1]] \quad (4b)$$

$$X_{1,s+1} = [D^*_{s+1}[0], D^*_{s+1}[1], \ldots, D^*_{s+1}[N_c-1]] \quad (4c)$$

$$X_{1,s} = [-D^*_s[0], -D^*_s[1], \ldots, -D^*_s[N_c-1]] \quad (4d)$$

Two IFFTs 106 and 108 inverse-discrete-Fourier-transform the space-time code symbol vectors $X_{l,m}$ and outputs four signal vectors $x_{l,m}$, as shown below in Equation (5):

$$x_{l,m} \triangleq [x_{l,m}[0], x_{l,m}[1], \ldots, x_{l,m}[N_c-1]] \quad (5)$$

where $x_{l,m}[n]$ is an nth sample of an OFDM modulation symbol to be transmitted in an mth OFDM symbol period through an lth transmit antenna. $x_{l,m}[n]$ is expressed in Equation (6), $$x_{l,m}[n] \triangleq \frac{1}{N_c} \sum_{k=0}^{N_c-1} X_{l,m}[k] W_N^{-nk} \quad (6)$$

where n=0, 1, ..., $N_{c-1}$ and $$W_{N_c}^m \triangleq e^{-j\frac{2\pi m}{N_c}}.$$

Parallel-to-serial (P/S) converters 110 and 112 convert the samples $x_{l,m}[n]$ to serial data streams. CP (Cyclic Prefix)

inserters 114 and 116 insert CPs into the serial data streams and transmit them through transmit antennas 118 and 120, respectively.

As described above, the A-STBC-OFDM transmitter performs four IFFT operations for two successive OFDM symbol periods and the IFFTs 106 and 108 are required for the individual transmit antennas 118 and 120.

Because an A-SFBC-OFDM transmitter is the same in structure as the A-STBC-OFDM transmitter, except for using an A-SFBC-OFDM coder rather than an A-STBC-OFDM coder, the A-SFBC-OFDM transmitter will be described herein below using FIG. 1. However, in this description, the A-STBC-OFDM coder 104 will be replace with an A-SFBC-OFDM coder 104.

As in the A-STBC-OFDM transmitter, in an A-SFBC-OFDM transmitter, the S/P converter 102 converts $N_c$ information symbols received from the data source 100 to the symbol vector $D_s$ of length $N_c$ expressed in Equation (1).

Using the symbol vector $D_s$, an A-SFBC-OFDM coder 104 generates two space-frequency code symbol vectors $X_{1,s}$ and $X_{2,s}$ to be transmitted in the sth OFDM symbol period. The space-frequency code symbol vector $X_{1,s}$ is generalized in Equation (7), $$X_{l,s} \triangleq [X_{l,s}[0], X_{l,s}[1], \ldots, X_{l,s}[N_c-1]] \quad (7)$$

where l=1, 2 and $X_{l,s}[k]$ represents a space-frequency code symbol transmitted on a kth sub-carrier in the sth OFDM symbol period through an lth transmit antenna.

Because the A-SFBC-OFDM coder 104 is based on Alamouti's space-time block code, in Equation (8), $$\begin{bmatrix} X_{1,s}[2v] & X_{1,s}[2v+1] \\ X_{2,s}[2v] & X_{2,s}[2v+1] \end{bmatrix} \triangleq \begin{bmatrix} D_s[2v] & D_s[2v+1] \\ -D_s^*[2v+1] & D_s^*[2v] \end{bmatrix} \quad (8)$$

where k=2v,2v+1,v=0,1, ...

$$\frac{N_c}{2} - 1.$$

Further, in Equations (9a) and (9b), $$X_{1,s} = [D_s[0], D_s[1], \ldots, D_s[N_c-2], D_s[N_c-1]] \quad (9a)$$

$$X_{2,s} = [-D^*_s[1], D^*_s[0], \ldots, -D^*_s[N_c-1], D^*_s[N_c-2]] \quad (9b)$$

The two IFFTs 106 and 108 inverse-discrete-Fourier-transform the space-frequency code symbol vectors $X_{l,s}$ and outputs two signal vectors $x_{l,s}$, as shown below in Equation (10):

$$x_{l,s} \triangleq [x_{l,s}[0], x_{l,s}[1], \ldots, x_{l,s}[N_c-1]] \quad (10)$$

where $x_{l,s}[n]$ is an nth sample of an OFDM modulation symbol to be transmitted in the sth OFDM symbol period through the lth transmit antenna. $x_{l,s}[n]$ is expressed in Equation (11).

$$x_{l,s}[n] \triangleq \frac{1}{N_c} \sum_{k=0}^{N_c-1} X_{l,s}[k] W_N^{-nk} \quad (11)$$

The P/S converters 110 and 112 convert the samples $x_{l,s}[n]$ to serial data streams. The CP inserters 114 and 116 insert CPs into the serial data streams and transmit them through the transmit antennas 118 and 120, respectively.

As described above, the A-SFBC-OFDM transmitter performs two IFFT operations for one OFDM symbol period and the IFFTs 106 and 108 are required for the individual transmit antennas 118 and 120.

FIG. 2 is a block diagram of a typical transmitter in a conventional A-STBC-OFDMIA-SFBC-OFDM system. It is noted from FIG. 2 that the number of IFFT operations increases in proportion of the number of transmit antennas.

In the above-described conventional A-STBC-OFDMI A-SFBC-OFDM transmitter, an IFFT operation is performed for each transmit antenna to generate a transmission signal. Therefore, computation complexity is high and power consumption is increased.

Aside from Alamouti's code-based OFDM systems, OFDM systems using space-time/space-frequency block coding based on space-time block codes require more transmit antennas perform IFFT operations in proportion to the number of transmit antennas. Consequently, the implementation complexity of transmitters is considerably increased. Therefore, there is a need for a method of reducing transmitter implementation complexity in an OFDM system based on space-time/space-frequency block coding.

SUMMARY OF THE INVENTION

An object of the present invention is to substantially solve at least the above problems and/or disadvantages and to provide at least the advantages below. Accordingly, an object of the present invention is to provide a transmitting apparatus and method for reducing a number of IFFT operations required to generate transmission data in an OFDM system in which data is transmitted on a plurality of sub-carriers through a plurality of antennas.

Another object of the present invention is to provide a transmitting apparatus and method for decreasing system implementation complexity by reducing a number of IFFT operations required to generate transmission data in an OFDM system in which data is transmitted on a plurality of sub-carriers through a plurality of antennas.

The above and other objects are achieved by providing an apparatus and method for transmitting data on a plurality of frequency sub-channels for a plurality of successive symbol periods through a plurality of transmit antennas in an OFDM system.

In the data transmitting apparatus, an S/P converter converts information symbols received from a data source to an information symbol vector, a coder generates at least one code symbol vector using the information symbol vector in at least one symbol period, an IFFT unit generates at least as many transmission signal vectors as twice the number of code symbol vectors generated in the coder for the one symbol period, a plurality of P/S converters each convert the transmission signal vectors to a transmission signal stream, and a guard interval inserter inserts a guard interval into each of the transmission signal streams received from the P/S converters and transmits the resulting signals through the transmit antennas.

In the data transmitting method, information symbols received from a data source are converted to an information symbol vector. At least one code symbol vector is generated using the information symbol vector in at least one symbol period. At least as many transmission signal vectors as twice the number of code symbol vectors generated for the one symbol period are generated and each of the transmission signal vectors is converted to a transmission signal stream. A guard interval is inserted into each of the transmission signal streams and the guard interval-having transmission signal streams are transmitted through the transmit antennas.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described in detail herein below with reference to the accompanying drawings. In the following description, well-known functions or constructions are not described in detail since they would obscure the invention in unnecessary detail.

Figure 1:
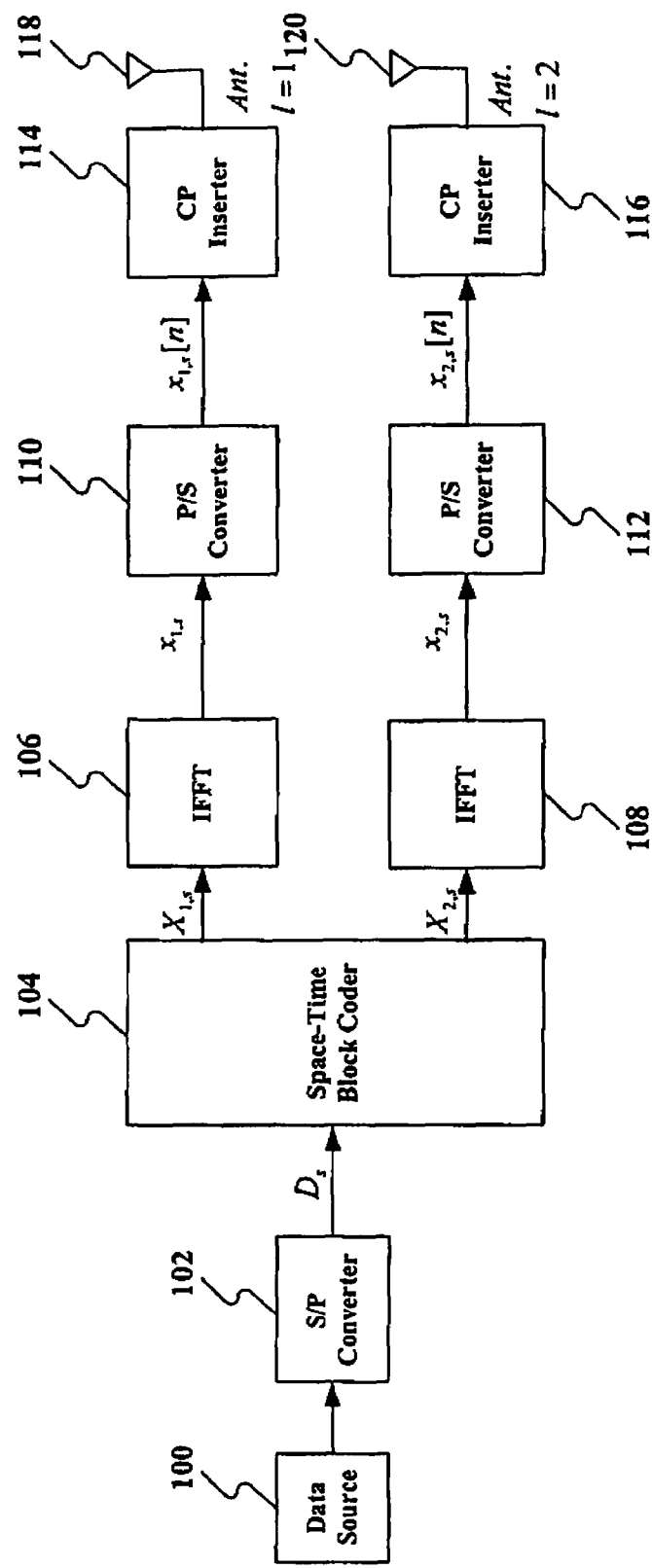
FIG. 1 is a block diagram of a transmitter in a conventional A-STBC-OFDM/A-SFBC-OFDM system using Alamouti's code.
Figure 2:
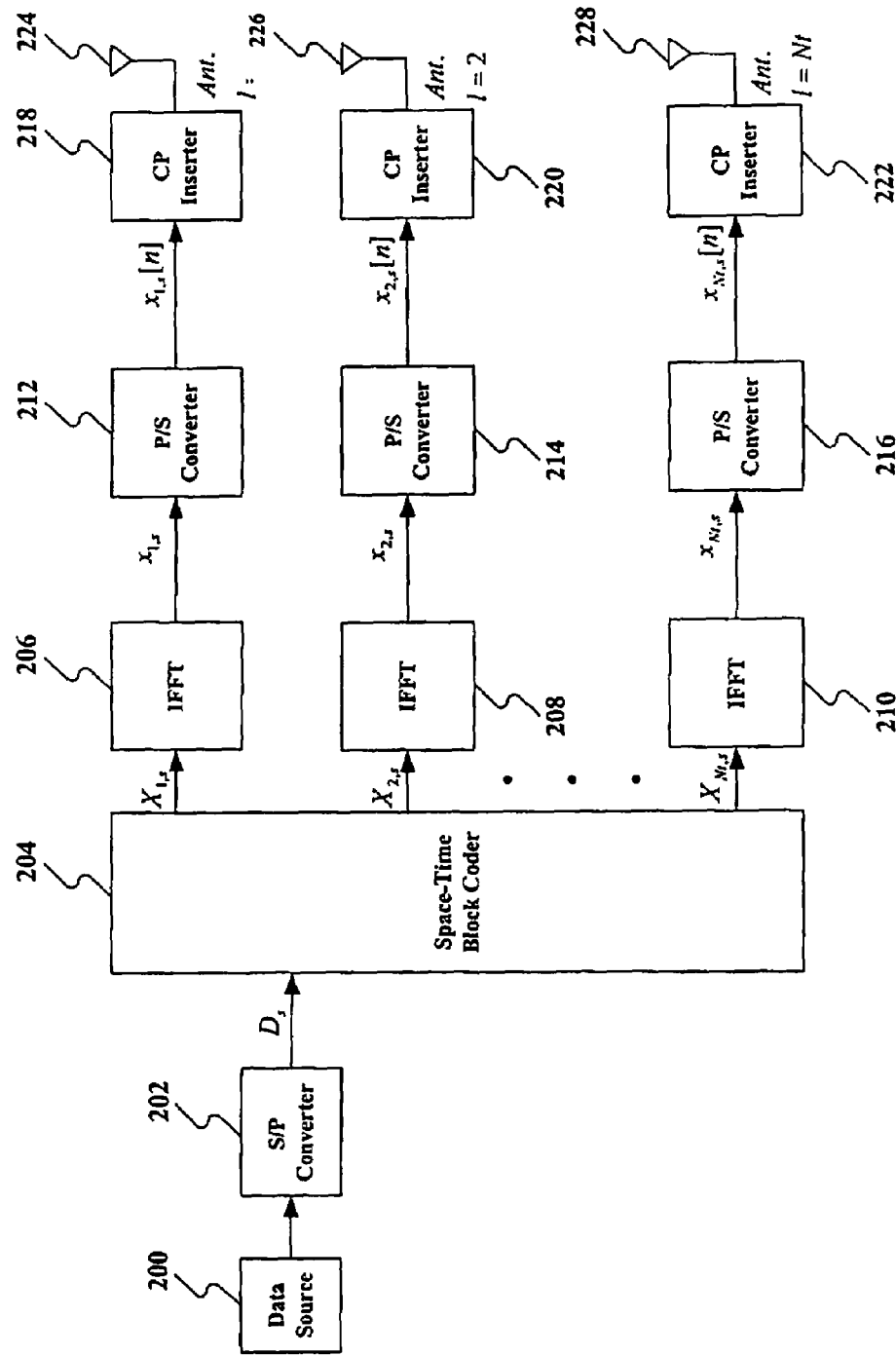
FIG. 2 is a block diagram of a typical transmitter in a conventional A-STBC-OFDM/A-SFBC-OFDM system.
Figure 3:
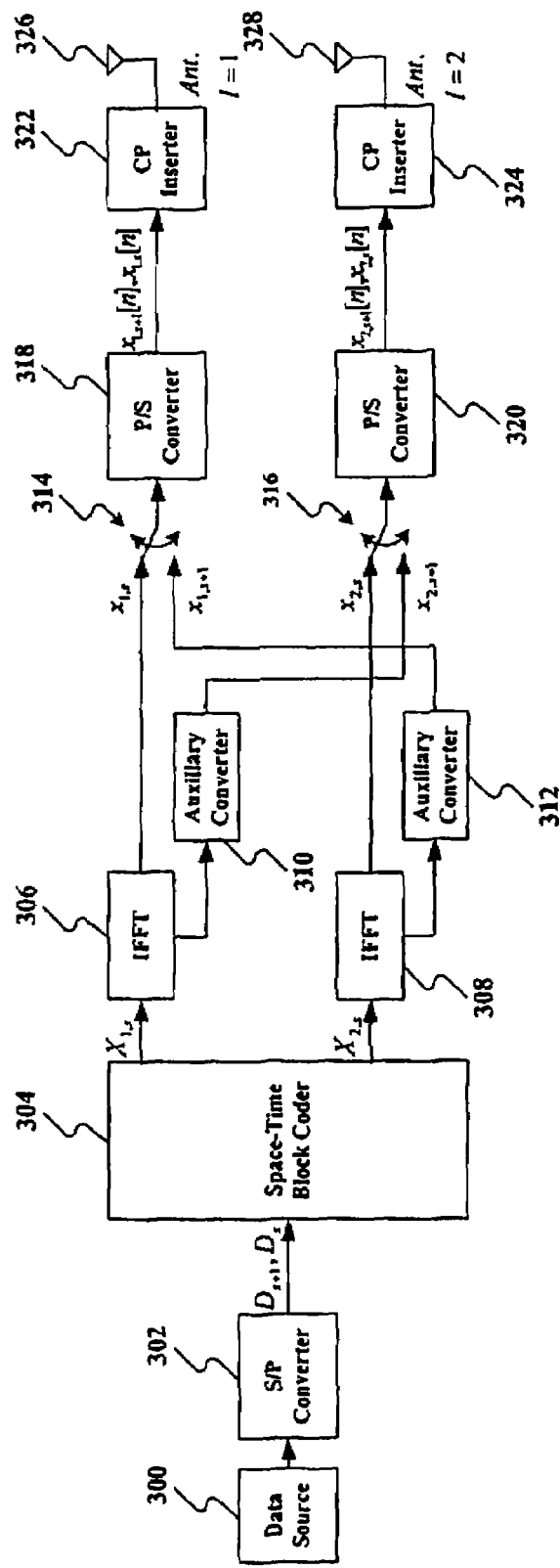
FIG. 3 is a block diagram of a transmitting apparatus according to an embodiment of the present invention.

FIG. 3 is a block diagram of a transmitting apparatus according to an embodiment of the present invention. Referring to FIG. 3, the transmitting apparatus includes a data source 300, an S/P converter 302 for converting $N_c$ information symbols received from the data source 300 to an information symbol vector $D_s$ (it is assumed herein that $N_c$ is a power of 2, equal to an IFFT length used in the transmitting apparatus), an A-STBC-OFDM coder 304 for generating four space-time code symbol vectors $X_{1,s}$, $X_{2,s}$, $X_{1,s+1}$, and $X_{2,s+1}$ for the input of two information symbol vectors $D_s$ and $D_{s+1}$ from the S/P converter 302, a pair of IFFT units 306 and 308 for inverse-fast-Fourier-transforming the space-time code symbol vectors $X_{1,s}$ and $X_{2,s}$ to be transmitted in parallel in an sth OFDM symbol period and outputting transmission signal vectors $x_{1,s}$ and $x_{2,s}$, and auxiliary converters 310 and 312 for generating transmission signal vectors $x_{1,s+1}$ and $x_{2,s+1}$ to be transmitted in an (s+1)th OFDM symbol period, from the transmission signal vectors $x_{1,s}$ and $x_{2,s}$. A pair of P/S converters 318 and 320 selectively receive $x_{1,s}$ and $x_{2,s}$ or $x_{1,s+1}$ and $x_{2,s+1}$ and convert them to transmission signal streams $x_{1,s}[n]/x_{1,s+1}[n]$ and $x_{2,s}[n]/x_{2,s+1}[n]$ ($n=0,1,\ldots,N_x$). A pair of switches 314 and 316 switch $x_{1,s}$ and $x_{2,s}$ or $x_{1,s+1}$ and $x_{2,s+1}$ to the P/S converters 318 and 320, and a pair of CP inserters 322 and 324 insert CPs into $x_{1,s}[n]/x_{1,s+1}[n]$ and $x_{2,s}[n]/x_{2,s+1}[n]$.

The first switch 314 switches the output port of the first IFFT 306 to the input port of the first P/S converter 318 in the sth OFDM symbol period, and the output port of the second auxiliary converter 312 to the input port of the first P/S converter 318 in the (s+1)th OFDM symbol period. The second switch 316 switches the output port of the second IFFT 308 to the input port of the second P/S converter 320 in the sth OFDM symbol period, and the output port of the first auxiliary converter 310 to the input port of the second P/S converter 320 in the (s+1)th OFDM symbol period.

Figure 4:
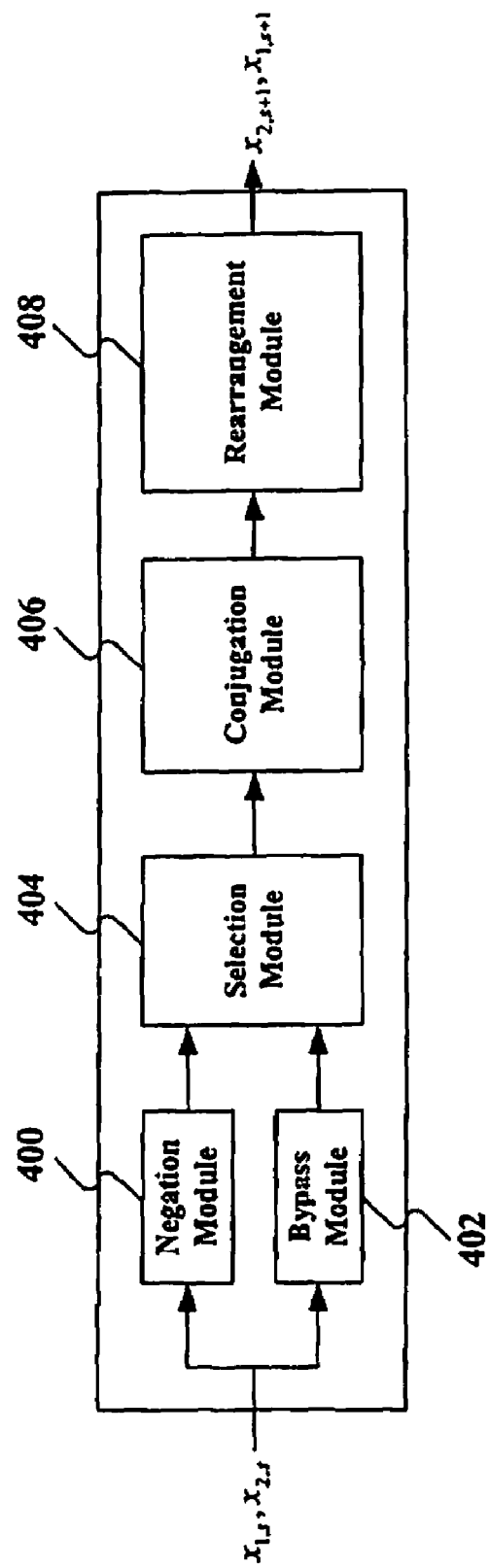
FIG. 4 is a detailed block diagram of an auxiliary converter in the transmitting apparatus illustrated in FIG. 3.

FIG. 4 is a detailed block diagram of the auxiliary converters 310 and 312 illustrated in FIG. 3. Referring to FIG. 4, the auxiliary converter 310 (or 312) at the output end of the IFFT unit 306 (or 308) includes a bypass module 402 for outputting the transmission signal vector $x_{1,s}$ (or $x_{2,s}$) received from the IFFT unit 306 (or 308), a negation module 400 for negating $x_{1,s}$ (or $x_{2,s}$), a selection module 404 for selecting one of the outputs of the bypass module 400 and the negation module 402, a conjugation module 406 for calculating the complex conjugate of the selected signal, and a rearrangement module 408 for rearranging the complex conjugate.

The first auxiliary converter 310 selects the negated value of $x_{1,s}$ output from the negation module 402, complex-conjugates the negated value of $x_{1,s}$, rearranges the complex conjugate, and outputs the transmission signal $x_{2,s+1}$ for the (s+1)th OFDM symbol period. The second auxiliary converter 312 selects the negated value of $x_{2,s}$ output from the negation module 402, complex-conjugates the negated value of $x_{2,s}$, rearranges the complex conjugate, and outputs the transmission signal $x_{1,s+1}$ for the (s+1)th OFDM symbol period.

The space-time code symbol vectors $X_{1,s}$, $X_{2,s}$, $X_{1,s+1}$ and $X_{2,s+1}$ generated in the A-STBC-OFDM coder 304 are mutually correlated in the relation shown in Equations (12a) and (12b) below.

$$X_{1,s+1}[k] = X_{2,s}^*[k] \tag{12a}$$

$$X_{2,s+1}[k] = -X_{1,s}^*[k] \tag{12b}$$

FFT is symmetrical to IFFT. Therefore, in Equation (13), $$x^*[((-n))_N] \xleftrightarrow{\text{DFT}} X^*[k], n = 0,1,\ldots,N_c-1, k = 0,1,\ldots,N_c-1 \tag{13}$$

where $((n))_N$ denotes n modulo N. From Equation (6), Equation (12a), and Equation (12b), Equations (14a) and (14b) are:

$$x_{1,s+1}[n] = x_{2,s}^*[((-n))_N] \tag{14a}$$

and $$x_{2,s+1}[n] = -x_{1,s}^*[((-n))_N] \tag{14b}$$

where $n=0,1,\ldots,N_c-1$.

According to the correlation between transmission signal vectors as represented by Equation (14a) and Equation (14b), $x_{1,s}[n]$ and $x_{2,s}[n]$ are generated through two IFFT operations for the first OFDM symbol period, whereas $x_{1,s+1}[n]$ and $x_{2,s+1}[n]$ are generated for the second OFDM symbol period by negating, complex-conjugating, and rearranging $x_{l,s}[n]$ and $X_{2,s}[n]$.

More specifically, $x_{1,s+1}$ to be transmitted through a first antenna 326 in the (s+1)th OFDM symbol period is produced by allowing $x_{2,s}$, which will be transmitted through a second antenna 328 in the sth OFDM symbol period, to bypass to the selection module 404 by the bypass module 400, selecting $x_{2,s}$ by the selection module 404, complex-conjugating $x_{2,s}$ by the conjugation module 406, and rearranging the complex conjugate by the rearrangement module 408. $x_{1,s+1}$ is transmitted to the first antenna 326 by switching the output port of the second auxiliary converter 312 to the input port of the first P/S converter 318 in the first switch 314 in the (s+1)th OFDM symbol period.

$x_{2,s+1}$ to be transmitted through the second antenna 328 in the (s+1)th OFDM symbol period is produced by negating $x_{1,s}$, which will be transmitted through the first antenna 326 in the sth OFDM symbol period, by the negation module 402, selecting the negated value of $x_{1,s}$ by the selection module 404, complex-conjugating $x_{1,s}$ by the conjugation module 406, and rearranging the complex conjugate by the rearrangement module 408. $x_{2,s+1}$ is transmitted to the second antenna 328 by switching the output port of the first auxiliary converter 410 to the input port of the second P/S converter 320 in the second switch 316 in the (s+1)th OFDM symbol period.

Figure 5:
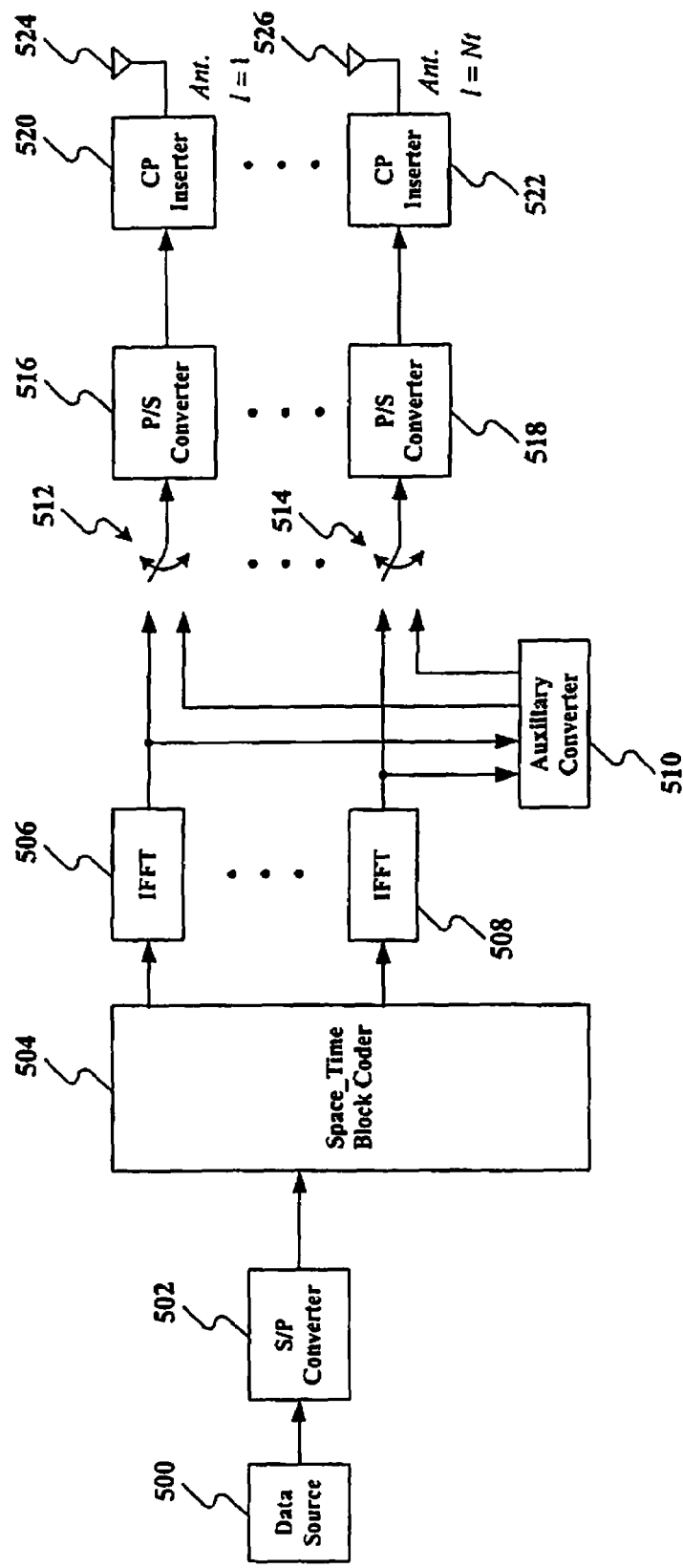
FIG. 5 is a block diagram of a transmitting apparatus according to another embodiment of the present invention.

FIG. 5 is a block diagram of a transmitting apparatus according to another embodiment of the present invention. $N_t$ denotes the number of transmit antennas and $N_x$ denotes the number of successive OFDM symbols.

Referring to FIG. 5, the transmitting apparatus includes a data source 500, an S/P converter 502 for converting information symbols received from the data source 500 to an information symbol vector, an A-STBC-OFDM coder 504 for generating space-time code symbol vectors for the input of the information symbol vector, a plurality of IFFT units 506 to 508 for inverse-fast-Fourier-transforming the space-time code symbol vectors and outputting transmission signal vectors, an auxiliary converter 510 for generating transmission signal vectors to be transmitted in the next OFDM symbol period, from the transmission signal vectors received from the IFFT units 506 to 508, P/S converters 516 to 518 for selectively receiving the transmission signal vectors from the IFFT units 508 and 508 and the auxiliary converter 510 and converting them to transmission signal streams, a plurality of switches 512 to 514 for switching the transmission signal vectors from the IFFY units 508 and 508 and the auxiliary converter 510 to the P/S converters 516 to 518 according to OFDM symbol periods, and a plurality of CP inserters 520 to 522 for inserting CPs into the transmission signal streams received from the P/S converters 516 to 518.

The components of the transmitting apparatus according to the second embodiment of the present invention operate in a similar manner to those of the transmitting apparatus according to the first embodiment of the present invention, except that the operation is performed with respect to $N_t$ transmit antennas and $N_x$ successive OFDM symbol periods.

The space-time code symbol vectors output from the A-STBC-OFDM coder 504 are mutually correlated in the relation shown in Equation (15a) and (15b).

$$X_{l_2,m_2} = \pm X_{l_1,s}, m_2 \in \{s+1, s+2, \cdots, s+N_x - 1\}, \quad (15a)$$

$$l_1 \in \{1, 2, \cdots N_t\}, l_2 \in \{1, 2, \cdots N_t\}$$

-continued
$$X_{l_2,m_2} = \pm X_{l_1,s}^*, m_2 \in \{s+1, s+2, \cdots, s+N_x - 1\}, \quad (15b)$$

$$l_1 \in \{1, 2, \cdots N_t\}, l_2 \in \{1, 2, \cdots N_t\}$$

In this case, the IFFT units 506 to 508 output a transmission signal vector $x_{l_1,s}$ for the input of the space-time code symbol vector $X_{l_1,s}$. $x_{l_1,s}$ is converted to a serial signal stream in the P/S converters 516 to 518, added with a CP in the CP inserters 520 to 522, and transmitted through the transmit antennas 524 to 526.

According to Equations (15a) and (15b), the auxiliary converter 510 outputs a transmission signal vector $x_{l_2,m_2}$ for the input of the signal vector $x_{l_1,s}$ of length $N_c$. $X_{l_2,m_2}$ is converted to a serial signal stream in the P/S converters 516 to 518, added with a CP in the CP inserters 520 to 522, and transmitted through the transmit antennas 524 to 526.

Figure 6:
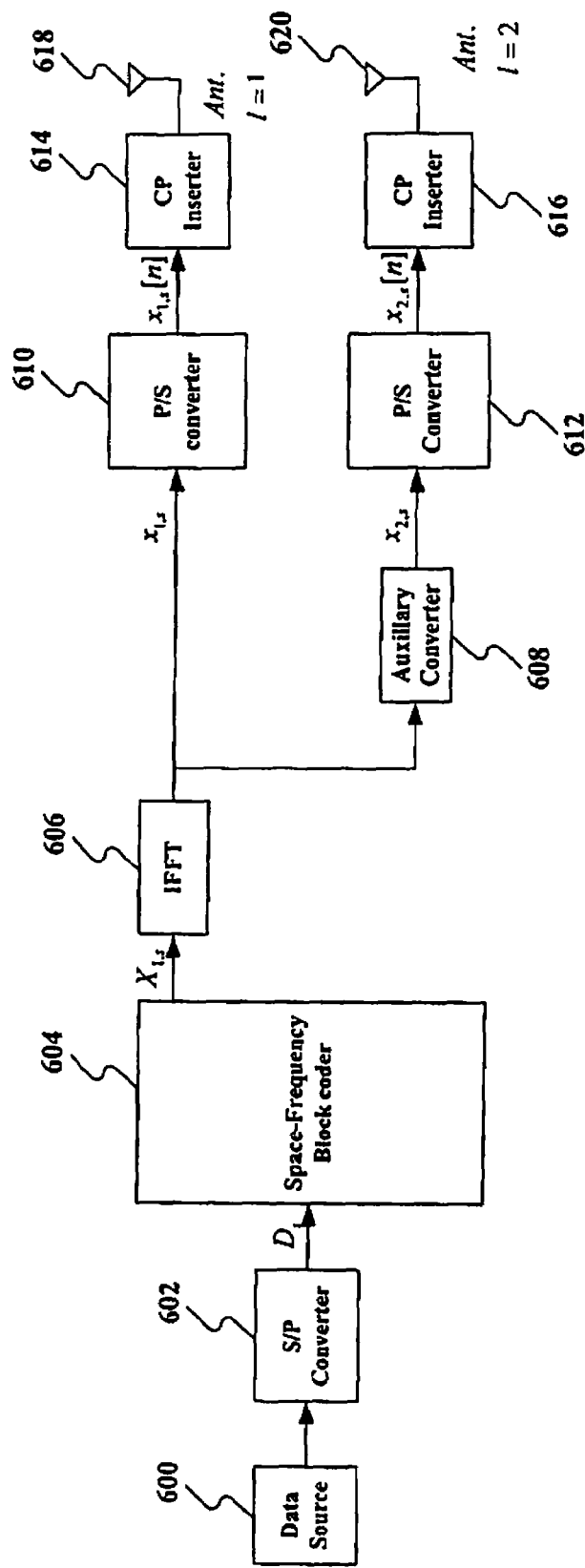
FIG. 6 is a block diagram of a transmitting apparatus according to a third embodiment of the present invention.

FIG. 6 is a block diagram of a transmitting apparatus according to a third embodiment of the present invention. The transmitting apparatus is characterized by transmitting two signals through one IFFT operation utilizing the symmetry between IFFT and IFFT.

Referring to FIG. 6, the transmitting apparatus includes a data source 600, an S/P converter 602 for converting $N_c$ information symbols received from the data source 600 to an information symbol vector $D_s$ (it is assumed herein that $N_c$ is a power of 2, equal to an IFFT length used in the transmitting apparatus), an A-SFBC-OFDM coder 604 for generating two space-frequency code symbol vectors of length $N_c$, $X_{1,s}$ and $X_{2,s}$ for the input of one information symbol vector $D_s$ from the S/P converter 602, an IFFT; unit 606 for inverse-fast-Fourier-transforming the space-frequency code symbol vectors $X_{1,s}$ and outputting a transmission signal vector $x_{1,s}$ for an sth OFDM symbol period, an auxiliary converter 608 for generating another transmission signal vector $X_{2,s}$ from the transmission signal vector $x_{1,s}$ a pair of P/S converters 610 and 612 for converting $x_{1,s}$ and $x_{2,s}$ to transmission signal streams $x_{1,s}[n]$ and $x_{2,s}[n]$ (n=0,1, ..., $N_c$), and a pair of CP inserters 614 and 616 for inserting CPs into $x_{1,s}[n]$ and $x_{2,s}[n]$ and transmitting the resulting signals through antennas 618 and 620.

Figure 7:
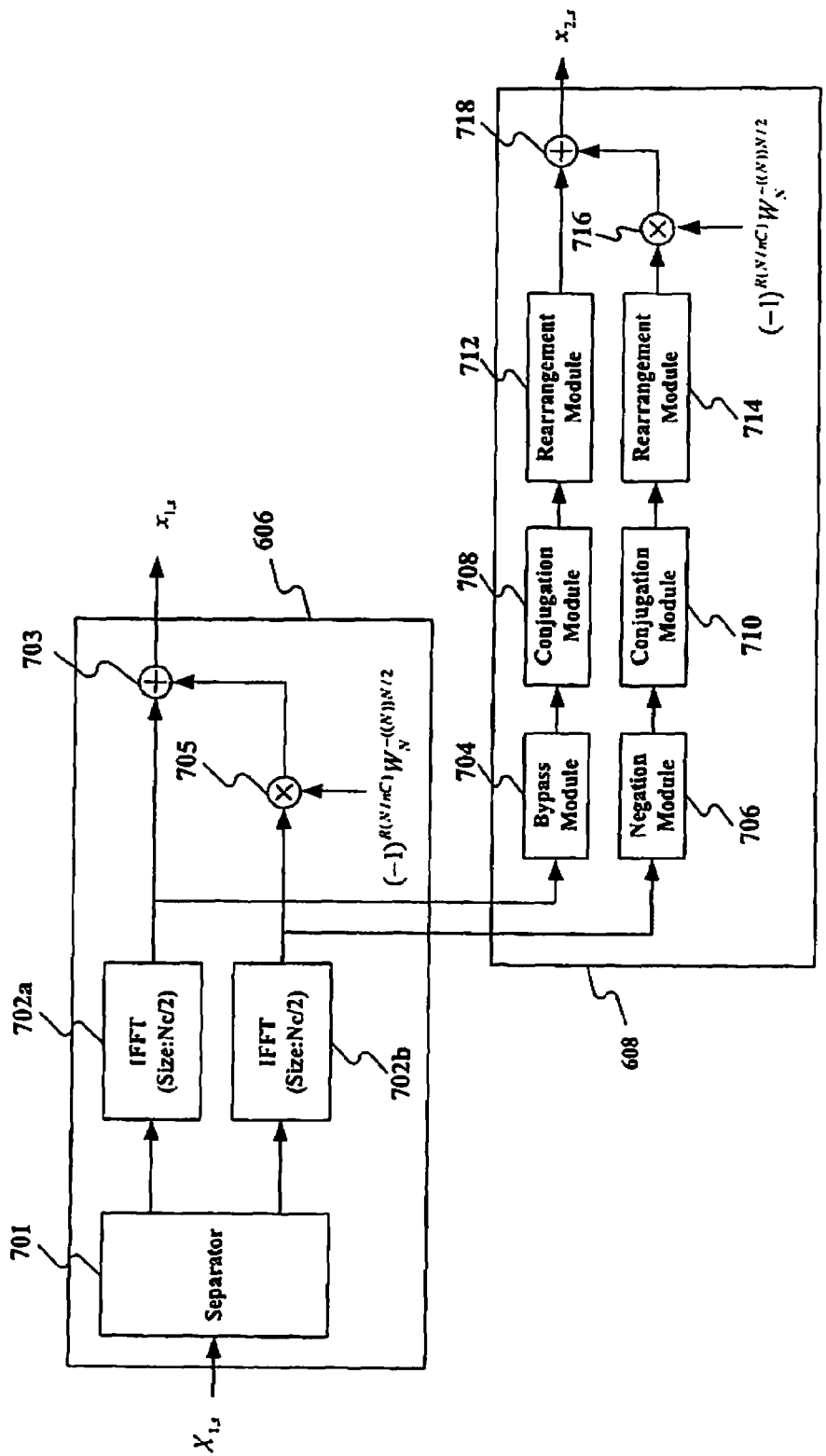
FIG. 7 is a detailed block diagram of an IFFT (Inverse Fast Fourier Transformer) unit and an auxiliary converter in the transmitting apparatus illustrated in FIG. 6.

FIG. 7 is a detailed block diagram of the IFFT unit 606 and the auxiliary converter 608 illustrated in FIG. 6. Referring to FIG. 7, the IFFT unit 606 includes a separator 701 for separating the space-frequency code symbol vector $X_{1,s}$ received from the A-SFBC-OFDM coder 604 into an odd-numbered element and an even-numbered element, a pair of IFFTs 702a and 702b for generating $$x_{2,s}^{(e)} \text{ and } x_{2,s}^{(o)}$$

by performing IFFT on the signals of length $N_c/2$ received from the separator 701, a first multiplier 705 for multiplying $$x_{2,s}^{(o)}$$

by $$(-1)^{r(n/N_c)} W_N^{-((n))N/2},$$

and a first adder 703 for adding $$x_{2,s}^{(e)}$$

to the product received from the first multiplier 705 and providing the sum to the P/S converter 610.

The auxiliary converter 608 includes a bypass module 704 for outputting the output of the first IFFT 702a, a first conjugation module 708 for calculating the complex conjugate of the output of the bypass module 704, a first rearrangement module 712 for rearranging the output of the first conjugation module 708 and outputting the resulting signal $$x_{2,s}^{(e)},$$

a negation module 706 for negating the output of the second IFFT 702b, a second conjugation module 710 for calculating the complex conjugate of the negated value, a second rearrangement module 714 for rearranging the complex conjugate and outputting the resulting signal $$x_{2,s}^{(o)},$$

a second multiplier 716 for multiplying $$x_{2,s}^{(o)}$$

by $$(-1)^{r(n/N_c)} W_N^{-((n))N/2},$$

and a second adder 718 for adding the outputs of the first rearrangement module 712 and the second multiplier 716, and outputting the sum $x_{2,s}$ to the second P/S converter 612.

As indicated above, the auxiliary converter 608 separates the space-frequency code symbol vector $X_{l,s}$, l=1,2 into an even-numbered element and an odd-numbered element. Therefore, the transmission signal stream $x_{l,s}[n]$, l=1,2, n=0, 1, ..., $N_c$−1 is represented in Equation (16), $$x_{l,s}[n] = \frac{1}{N_c} \sum_{k=0}^{N_c-1} X_{l,s}[k] W_{N_c}^{-nk} \qquad (16)$$

$$= \frac{1}{N_c} \sum_{v=0}^{\frac{N_c}{2}-1} (X_{l,s}[2v] + W_{N_c}^{-n} X_{l,s}[2v+1]) W_{N_c/2}^{-nv}$$

$$= \frac{1}{2}(x_{l,s}^{(e)}[n] + W_{N_c}^{-n} x_{l,s}^{(o)}[n])$$

where $$x_{l,s}^{(e)}[n], x_{l,s}^{(o)}[n], l = 1, 2, n = 0, 1, \cdots, N_c - 1$$

is defined as shown in Equation (17).

$$x_{l,s}^{(e)}[n] = \frac{2}{N_c} \sum_{v=0}^{\frac{N_c}{2}-1} X_{l,s}[2v] W_{N_c/2}^{-nv}, \qquad (17)$$

$$x_{l,s}^{(o)}[n] = \frac{2}{N_c} \sum_{v=0}^{\frac{N_c}{2}-1} X_{l,s}[2v+1] W_{N_c/2}^{-nv}$$

Because $$x_{l,s}^{(e)}[n], x_{l,s}^{(o)}[n]$$

has a period of $N_c/2$ for n, it can be replaced by $$x_{l,s}^{(e)}[((n))_{N/2}], x_{l,s}^{(o)}[((n))_{N/2}]$$

and the relationship in Equation (18) is established:

$$W_{N_e}^{-n} = W_{N_e}^{-\left(((n))_{N_e/2} + \frac{N_e}{2} r\left(\frac{n}{N_e}\right)\right)} \qquad (18)$$

$$= W_{N_e}^{-((n))_{N_e/2}} (W_{N_e}^{-N_e/2})^{r\left(\frac{n}{N_e}\right)}$$

$$= (-1)^{r\left(\frac{n}{N_e}\right)} W_{N_e}^{-((n))_{N_e/2}}$$

where r(x) is a rounded-off number. Therefore, $x_{l,s}[n]$ of Equation (16) can be expressed as shown in equation (19).

$$x_{l,s}[n] = \frac{1}{2} \left\{ x_{l,s}^{(e)}[((n))_{N_e/2}] + (-1)^{r\left(\frac{n}{N_e}\right)} W_{N_e}^{-((n))_{N_e/2}} x_{l,s}^{(o)}[((n))_{N_e/2}] \right\} \qquad (19)$$

Meanwhile, from Equation (8), in Equations (20a) and (20b)

$$X_{2,s}[2v] = -X_{1,s}^*[2v+1] \qquad (20a)$$

and $$X_{2,s}[2v+1] = X_{1,s}^*[2v] \qquad (20b)$$

where $v = 0, 1, \cdots, \frac{N_c}{2} - 1$.

From Equation (13), Equation (17), Equation (20a) and (20b), Equations (21a) and (21b) are:

$$x_{2,s}^{(e)}[((n))_{N_c/2}] = -(x_{1,s}^{(o)}[((-n))_{N_c/2}])^* \quad (21a)$$

and $$x_{2,s}^{(o)}[((n))_{N_c/2}] = (x_{1,s}^{(3)}[((-n))_{N_c/2}])^*. \quad (21b)$$

It is noted from the above equations that $$x_{2,s}^{(e)}[((n))_{N_c/2}], x_{2,s}^{(o)}[((n))_{N_c/2}]$$

are easily achieved by negating, complex-conjugating, and rearranging $$x_{1,s}^{(e)}[((n))_{N_c/2}] \text{ and } x_{1,s}^{(o)}[((n))_{N_c/2}].$$

Therefore, $x_{2,s}[n]$ is obtained from Equation (22).

$$x_{2,s}[n] = \frac{1}{2}\{-(x_{1,s}^{(o)}[((n))_{N_c/2}])^* + \\ (-1)^{t(\frac{n}{N_c})} W_n^{-((n))_{N_c/2}} (x_{1,s}^{(e)}[((n))_{N_c/2}])^*\} \quad (22)$$

Because $x_{2,s}[n]$ is achieved from $$x_{1,s}^{(e)}[((n))_{N_c/2}], x_{1,s}^{(o)}[((n))_{N_c/2}]$$

involved in calculating $x_{l,s}[n]$, there is no need to perform an additional IFFT operation. However, $N_c/2$ complex multiplications and $N_c$ complex additions are additionally required.

Figure 8:
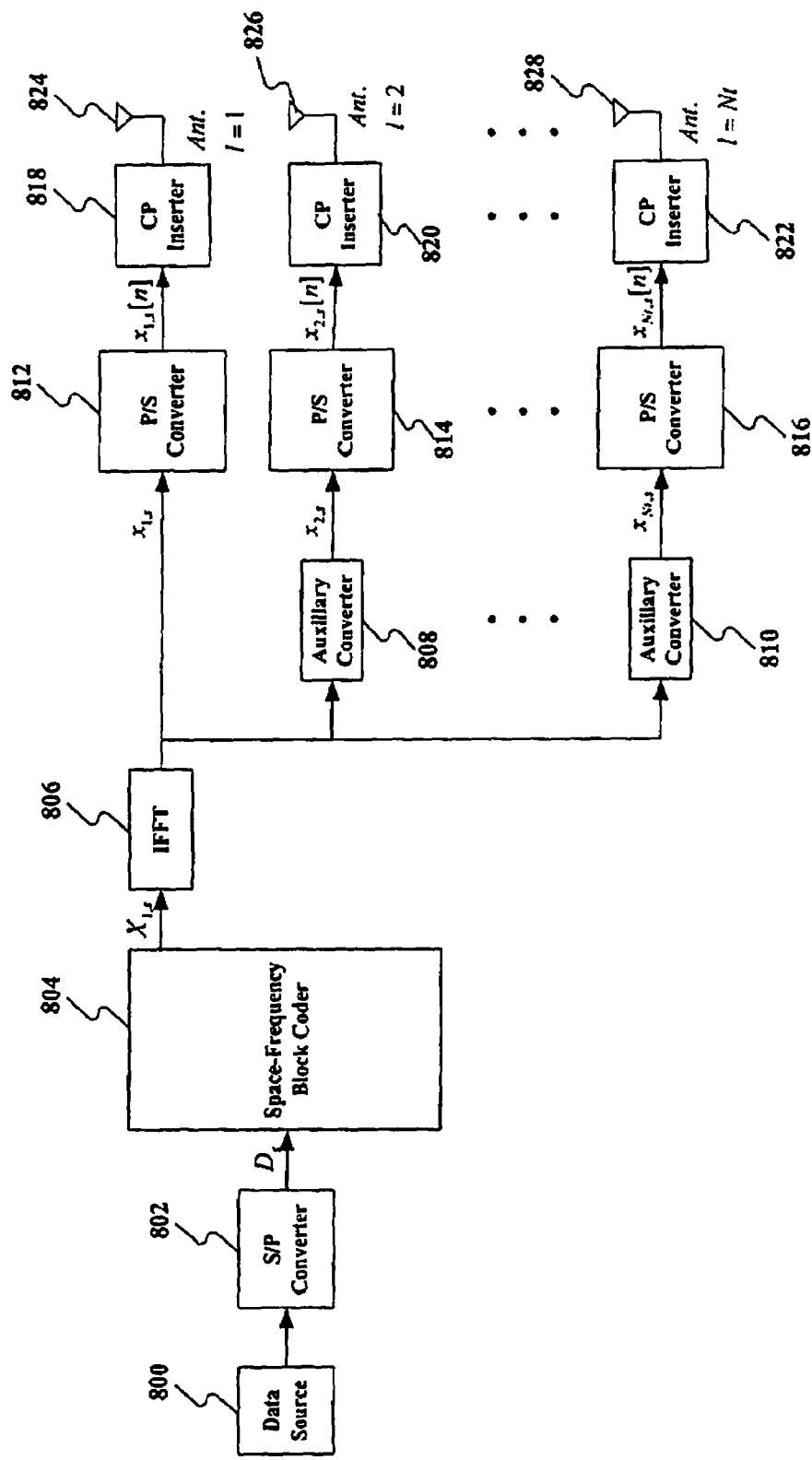
FIG. 8 is a block diagram of a transmitting apparatus according to a fourth embodiment of the present invention.

FIG. 8 is a block diagram of a transmitting apparatus according to a fourth embodiment of the present invention. $N_t$ denotes the number of transmit antennas and $N_s$ denotes the number of contiguous subcarriers, which is generalized by a power of 2 and less than $N_c$.

Referring to FIG. 8, the transmitting apparatus includes a data source 800, an S/P converter 802 for converting information symbols received from the data source 800 to an information symbol vector $D_s$, an A-SFBC-OFDM coder 804 for generating space-frequency code symbol vectors $X_{1,s}$, $X_{2,s}$, ..., $X_{Nt,s}$ for the input of $D_s$, an IFFT 806 for inverse-fast-Fourier-transforming the space-frequency code symbol vectors and outputting a transmission signal vector, a plurality of auxiliary converters 808 to 810, each for generating another transmission signal vector from the transmission signal vector received from the IFFT unit 806, a plurality of P/S converters 812 to 816 for converting transmission signal vectors $x_{1,s}$, $x_{2,s}$, ..., $x_{Nt,s}$ received from the IFFT unit 806 and auxiliary converters 812 to 816 to transmission signal streams $x_{1,s}[n]$, $x_{2,s}[n]$, $x_{Nt,s}[n]$, n=0,1, ..., $N_c$, and a plurality of CP inserters 818 to 822 for inserting CPs into the transmission signal streams received from the P/S converters 812 to 816 and transmitting the resulting signals through transmit antennas 824 to 828 at their respective output ends.

The components of the transmitting apparatus according to the fourth embodiment of the present invention operate in a similar manner to those of the transmitting apparatus according to the third embodiment of the present invention, except that the operation is performed with respect to $N_t$ transmit antennas and $N_s$ successive sub-carriers.

In the fourth embodiment of the present invention, the space-frequency code symbol vectors output from the A-SFBC-OFDM coder 804 are correlated in the relationship shown in Equations (23a) and (23b):

$$X_{l_2,s}^{(q_2)} = \pm X_{1,s}^{(q_1)}, q_1 \in \{0, 1, 2, 3, ..., N_s - 1\}, \quad (23a)$$
$$q_2 \in \{1, 2, 3, ..., N_s\}, l_1 \in \{2, ... N_t\}$$

and $$X_{l_2,s}^{(q_2)} = \pm \{X_{1,s}^{(q_1)}\}^*, q_1 \in \{0, 1, 2, 3, ..., N_s - 1\}, \quad (23b)$$
$$q_2 \in \{1, 2, 3, ..., N_s\}, l_1 \in \{2, ... N_t\}$$

where $X_{l,s}^{(q)} \triangleq [X_{l,s}[0 \cdot N_s + q], X_{l,s}[1 \cdot N_s + q], ...,$
$X_{l,s}[(N_c/N_s - 1) \cdot N_s + q], q = 0, 1, ..., N_s - 1.$ In this case, the space-frequency code symbol vector $X_{1,s}$ is converted to the transmission signal vector $x_{1,s}$ by the IFFT unit 806. $x_{1,s}$ is serialized by the P/S converter 812, added with a CP by the CP inserter 818, and transmitted through the transmit antenna 824.

According to Equation (23a) and Equation (23b), $x_{l_2,s}$ is achieved by processing $$X_{1,s}^{(q_1)},$$

which is obtained through IFFT operation of $X_{1,s}$, in the auxiliary converters 814 to 816. The transmission signal vectors $x_{2,s}[n]$ to $x_{Nt,s}[n]$ from the auxiliary converter 808 to 810 are serialized by the P/S converters 820 to 822, added with CPs by the CP inserters 820 to 822, and transmitted through the transmit antennas 826 to 828.

In accordance with the present invention as described above, an OFDM transmitting apparatus reduces the number of IFFT operations required for generation of transmission signals to be transmitted through a plurality of transmit antennas. Therefore, the implementation complexity of the transmitting apparatus is minimized and coding efficiency is increased.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. An apparatus for transmitting data on a plurality of frequency sub-channels for a plurality of successive symbol periods through a plurality of transmit antennas in an orthogonal frequency division multiplexing (OFDM) system, the apparatus comprising:
   a serial-to-parallel (S/P) converter-for converting information symbols received from a data source to an information symbol vector;
   a coder generating at least one code symbol vector using the information symbol vector in at least one symbol period;
   an inverse fast Fourier transformer (IFFT) unit generating at least as many transmission signal vectors as twice a number of code symbol vectors generated in the coder for the at least one symbol period, and generating transmission signal vectors by inverse-fast-Fourier-transforming the at least one code symbol vector to be transmitted on a successive sub-carrier using the transmission signal vectors;

at least one auxiliary converter generating a transmission signal vector to be transmitted on a successive sub-carrier using the transmission signal vector received from the IFFT unit;

a plurality of parallel-to-serial (P/S) converters converting each of the transmission signal vectors to a transmission signal stream; and a plurality of guard interval inserters inserting a guard interval into each of the transmission signal streams received from the P/S converters and transmitting the guard interval-inserted transmission signal streams through the transmit antennas, wherein the IFFT unit comprises:

a separator for separating the at least one code symbol vector into an odd-numbered element and an even-numbered element;

first and second constituent inverse fast Fourier transformers inverse-fast-Fourier-transforming the odd-numbered element and the even-numbered element;

a multiplier multiplying an output of the second constituent inverse fast Fourier transformer by a value; and an adder adding an output of the first constituent inverses fast Fourier transformer and an output of the multiplier.

2. The apparatus of claim 1, wherein the coder is a space-frequency block coder.

3. The apparatus of claim 1, wherein the at least one code symbol vector is a space-frequency block coded symbol vector.

4. The apparatus of claim 1, wherein the transmission signal vectors are transmitted on at least two successive sub-channels.

5. The apparatus of claim 1, wherein the at least one auxiliary converter comprises:

a bypass module outputting the output of the first constituent inverse fast Fourier transformer;

a first conjugation module complex-conjugating the output of the bypass module;

a first rearrangement module rearranging the output of the first conjugation module;

a negation module negating the output of the second constituent inverse fast Fourier transformer;

a second conjugation module complex-conjugating the output of the negation module;

a second rearrangement module rearranging the output of the second conjugation module;

a multiplier multiplying the output of the second rearrangement module by a predetermined value; and an adder generating another transmission signal vector by adding the output of the first rearrangement module and the output of the multiplier.

6. The apparatus of claim 1, wherein the at least one auxiliary converter is replaced by $2^m-1$ auxiliary converters, wherein m is an integer, generating transmission signal vectors to be transmitted for a following symbol period using the transmission signal vectors received from the inverse fast Fourier transformer.

7. The apparatus of claim 6, wherein the separator separates the at least one code symbol vector into elements of a power $2(2^m$, where m is integer) that is less than the number of sub-carriers;

the second constituent inverse fast Fourier transformer includes $2^m$ constituent inverse fast Fourier transformers inverse-fast-Fourier-transforming each of the elements;

the multiplier includes $(2^m-1)$ multipliers multiplying the output of each of $(2^m-1)$ constituent inverse fast Fourier transformers except the output of the first constituent inverse fast Fourier transformer by a predetermined value; and the adder adding the output of the first constituent inverse fast Fourier transformer and the output of the $(2^m-1)$ multipliers.

8. The apparatus of claim 7, wherein the at least one auxiliary converter comprises:

a negation module negating the constituent inverse fast Fourier transformer;

a bypass module outputting the same output of the constituent inverse fast Fourier transformer used for negating;

a selection module selecting one of the outputs of the bypass module and the negation module;

a conjugation module for complex-conjugating the output of the selection module;

a rearrangement module rearranging the output of the conjugation module;

$(2^m-1)$ multipliers (where m is integer) multiplying each of $(2^m-1)$ rearrangement modules except the output of the first rearrangement module by each predetermined value; and the adder generating another transmission signal vector by adding the output of the first rearrangement module and the outputs of the $(2^m-1)$ multipliers.

9. A method of transmitting data on a plurality of frequency sub-channels for a plurality of successive symbol periods through a plurality of transmit antennas in an orthogonal frequency division multiplexing (OFDM) system, the method comprising the steps of:

converting information symbols received from a data source to an information symbol vector;

generating at least one code symbol vector using the information symbol vector in at least one symbol period;

generating at least as many transmission signal vectors as twice a number of code symbol vectors generated for the one symbol period;

converting each of the transmission signal vectors to a transmission signal stream;

inserting a guard interval into each of the transmission signal streams; and transmitting the guard interval-included transmission signal streams through the transmit antennas, wherein the step of generating at least as many transmission sianal vectors comprises:

generating transmission signal vectors to be transmitted on a sub-carrier for the one symbol period by inverse-fast-Fourier-transforming the at least one code vector; and generating at least one more transmission signal vector to be transmitted on a successive sub-carrier for the same symbol period using the transmission signal vectors; and wherein the step of inverse-fast-Fourier transforming comprises:

separating the at least one code symbol vector into an odd-numbered element and an even-numbered element;

inverse-fast Fourier transforming the odd-numbered element and the even-numbered element;

outputting first and second inverse fast Fourier transform signals;

multiplying the second inverse-fast-Fourier transform signal by a predetermined value; and adding the first inverse fast Fourier transform signal and the multiplication value.

10. The method of claim 9, wherein the step of generating the at least one more transmission signal vector comprises the steps of:

outputting the first inverse fast Fourier transform signal;

first-complex-conjugating the bypassed signal;

first-rearranging the first complex conjugated signal;

negating the second inverse fast Fourier transform signal;

second-complex-conjugating the negated signal;

second-rearranging the second complex conjugated signal;

multiplying the second rearrangement signal by a predetermined value; and generating another transmission signal vector by adding the first rearrangement signal and the multiplication value.

11. The method of claims 9, wherein the step of generating the transmission signal vectors comprise:

generating a transmission signal vector by inverse-fast-Fourier-transforming the at least one code symbol vector for the one symbol period; and generating a transmission signal vector to be transmitted on a successive sub-carrier using the transmission signal vector received from the inverse fast Fourier transformer.

12. The method of claim 9, wherein the inverse-fast-Fourier-transforming step comprises the steps of:

separating the at least one code symbol vector into elements of a power of $2(2^m$, where m is integer) that is less than the number of sub-carriers;

inverse-fast-Fourier-transforming each of the elements of a power of $2(2^m)$ and outputting $2^m$ constituent inverse-fast-Fourier transform signals;

multiplying each of the $(2^m-1)$ constituent inverse-fast-Fourier transform signals except the first constituent inverse fast Fourier transform signal by each predetermined value; and generating another transmission signal vector by adding the first constituent inverse fast Fourier transform signal and the $(2^m-1)$ multiplication values.

13. The method of claim 9, wherein the step of generating the at least one more transmission signal vector comprises the steps of:

negating each of the constituent inverse fast Fourier transform signals;

bypassing each of the same constituent inverse fast Fourier transform signals used for negating;

selecting one of the negated signal and the bypassed signal;

complex-conjugating the selected signal;

rearranging the complex-conjugated signal;

multiplying each $(2^m-1)$ (where m is integer) rearranged signals except the first rearranged signal by each predetermined value; and generating another transmission signal vector by adding the first rearranged signal and the $(2^m-1)$ multiplication values.

14. The method of claim 9, wherein the coder is a space-frequency block coder.

15. The method of claim 9, wherein the at least one code symbol vector is a space-frequency block coded symbol vector.

16. The method of claim 9, wherein the transmission signal vectors are transmitted on at least two successive sub-channels.

17. The method of claims 9, wherein the step of generating the transmission signal vectors comprise:

generating a transmission signal vector by inverse-fast-Fourier-transforming the at least one code symbol vector for the one symbol period; and generating a transmission signal vector to be transmitted on a successive sub-carrier using the transmission signal vector.

* * * * *